US012744437B2

(12) United States Patent
de Swardt et al.

(10) Patent No.: US 12,744,437 B2
(45) Date of Patent: Sep. 22, 2026

(54) REFURBISHING WIND TURBINE GENERATOR STATOR WINDING WITH WINDING CONVERSIONS

(71) Applicant: Timken Gears & Services Inc., King of Prussia, PA (US)

(72) Inventors: Jan H. de Swardt, Eustis, FL (US); Randall W. Russell, Kennewick, WA (US)

(73) Assignee: Timken Gears & Services Inc., King of Prussia, PA (US)

( * ) Notice: Subject to any disclaimer, the term of this patent is extended or adjusted under 35 U.S.C. 154(b) by 0 days.

(21) Appl. No.: 18/827,290

(22) Filed: Sep. 6, 2024

(65) Prior Publication Data

US 2025/0141326 A1 May 1, 2025

Related U.S. Application Data

(60) Provisional application No. 63/594,816, filed on Oct. 31, 2023.

(51) Int. Cl.

| | |
|---|---|
| ***H02K 15/50*** | (2025.01) |
| ***H02K 1/16*** | (2006.01) |
| ***H02K 3/24*** | (2006.01) |
| ***H02K 3/28*** | (2006.01) |
| ***H02K 3/34*** | (2006.01) |
| ***H02K 7/18*** | (2006.01) |
| *F03D 80/50* | (2016.01) |

(52) U.S. Cl.

CPC ............ *H02K 15/50* (2025.01); *H02K 1/165* (2013.01); *H02K 3/24* (2013.01); *H02K 3/28* (2013.01); *H02K 3/345* (2013.01); *H02K 7/183* (2013.01); *F03D 80/504* (2023.08); *F05B 2230/80* (2013.01)

(58) Field of Classification Search

CPC .......... H02K 15/50; H02K 1/165; H02K 3/24; H02K 3/28; H02K 3/345; H02K 7/183; F03D 80/504; F05B 2230/80

See application file for complete search history.

(56) References Cited

U.S. PATENT DOCUMENTS

2023/0307980 A1* 9/2023 Wyderski .............. H02K 5/203

OTHER PUBLICATIONS

Leroy Somer, “FLSB-FLSLB slip ring totally enclosed three-phase asynchronous motors,” <https://vecgroup.com/assets/pdf/katalog-elektrodvigateli-leroy-somer-s-faznym-rotorom-serii-flsb-flslb.pdf> web page visited Apr. 3, 2025 (16 pages).

Vestas, “Vestas V47,” <https://en.wind-turbine-models.com/turbines/13-vestas-v47> web page visited Sep. 6, 2024 (6 pages).

* cited by examiner

*Primary Examiner* — Nirvana Deonauth

(74) *Attorney, Agent, or Firm* — Michael Best & Friedrich LLP

(57) ABSTRACT

Stators for use in electric machines and methods for refurbishing the same. One method for refurbishing a stator for use in an electric machine includes at least partially disassembling the stator to provide access to a plurality of stator windings connected in a four-circuit star connection having three turns per coil, and reconfiguring the stator such that the plurality of stator windings are connected in a four-circuit delta connection having five turns per coil.

5 Claims, 15 Drawing Sheets

REFURBISHING WIND TURBINE GENERATOR STATOR WINDING WITH WINDING CONVERSIONS

CROSS-REFERENCE TO RELATED APPLICATIONS

This application claims priority to U.S. Provisional Patent Application No. 63/594,816, filed on Oct. 31, 2023, the entire contents of which are incorporated by reference herein.

SUMMARY

Generators, such as Doubly Fed Induction Generators (DFIG) wind generators experience rotor and/or stator failures that result in needing replacement of the rotor and/or stator. The mean time between failures (MTBF) is typically less than seven years, while the expectation for mean time between failures are more than 10 years. Accordingly, there is a need to replace DFIG wind generator components with upgraded components that can extend the mean time between failures.

Embodiments described herein relate to upgrading original wind generator stators with new stators less prone to failures. Stators described herein generally relate to high-powered generators, such as power ratings ranging from 600 to 800 kW (for example, 660 kW) and voltage ratings ranging from 525 to 700 V (for example, 690 V). Generators described herein may have a frequency of either 50 Hz or 60 Hz and a synchronous speed range between 1000 and 2000 rpm. Once failed, the generator can be taken out of service and either replaced by a new original equipment unit (which still contain the original cause of premature failure) or advantageously refurbished at a lower cost than a full replacement with a design upgrade that address the cause for premature failure. It would be possible to incorporate these design upgrades into the design of a new, improved Original Equipment Manufacturer (OEM) design to be used to manufacture new generators.

Since these causes of failures may also be experienced in electric motors stators (for squirrel cage induction, synchronous and wound rotor asynchronous), and/or rotors (for wound rotor asynchronous), the described improvements can be implemented both on electric motors and generators. Collectively these will be referred to "machines," which should be understood to include both motors and generators.

Example methods for refurbishing a stator for use in an electric machine include at least partially disassembling the stator to provide access to a plurality of stator windings connected in a four-circuit star connection having three turns per coil, and reconfiguring the stator such that the plurality of stator windings are connected in a four-circuit delta connection having five turns per coil.

In some aspects, the plurality of stator windings has a concentric wound, multi span configuration, and the method further includes replacing the plurality of stator windings with a second plurality of stator windings having a lap wound, single span configuration.

In some aspects, the plurality of stator windings are fully annealed copper windings.

In some aspects, the stator includes one selected from the group consisting of 36 slots, 48 slots, 60 slots, 72 slots, 84 slots, and 96 slots.

In some aspects, the method further includes removing cooling blocks situated at an overhang portion of the plurality of stator windings.

Example stators for use in an electric machine include a plurality of windings, wherein the plurality of windings are lap wound, single span windings, wherein each winding of the plurality of windings includes an overhang portion, wherein each overhang portion is taped with glass cloth or tape, and a plurality of phase separators manufactured from flexible aramid or aramid composite paper, situated between each phase of the stator.

In some aspects, the coil to coil voltage and phase to phase voltage are each uniform throughout each winding of the plurality of windings.

In some aspects, the tape is porous glass cloth or tape.

In some aspects, the stator includes a plurality of trapezoidal slots configured to support the plurality of windings.

In some aspects, the plurality of trapezoidal slots are insulated with an aramid paper, polyimide film, aramid paper composite insulation.

Example methods for refurbishing a stator for use in an electric machine include at least partially disassembling the stator to provide access to a plurality of stator windings, wherein overhang portions of the plurality of windings are connected via one or more braze joints; removing the one or more braze joints; and connecting the overhang portions of the plurality of windings directly to a generator terminal.

In some aspects, connecting the overhang portions includes bolting the overhang portions of the plurality of windings directly to the generator terminal.

Example methods for manufacturing a stator for use in an electric machine include connecting the overhang portions of the plurality of windings directly to a generator terminal, without the use of internal brazing joints.

In some aspects, connecting the overhang portions includes bolting the overhang portions of the plurality of windings directly to the generator terminal.

Other aspects of the invention will become apparent by consideration of the detailed description and accompanying drawings.

Figure 1:
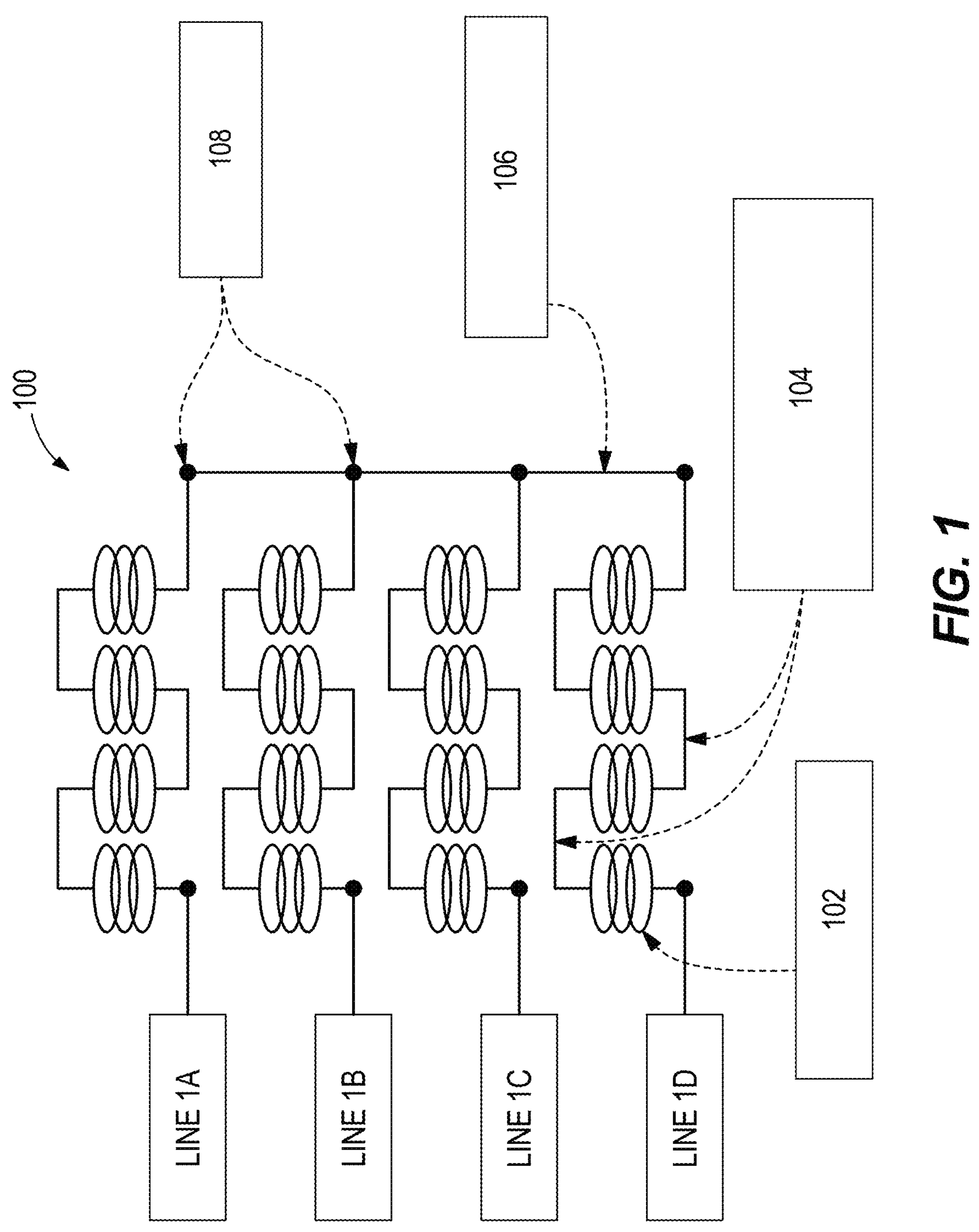
FIG. 1 illustrates a winding configuration for an example original stator.

Other aspects of the embodiments described herein will become apparent by consideration of the detailed description.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Stators described herein may be implemented in a wind turbine generator that has respective power and voltage ratings of 660 kilowatts (kW) and 690 volts (V). However, it should be understood that description herein of the flaws and proposed improvements to the design of the original stator may also be applicable to stator designs implemented in wind turbine generators having other electrical ratings. For example, the designs and methods for constructing, installing, and/or refurbishing wound rotors described herein may also be applicable to generators/motors rated to 600-800 kW, 525-700V, 50-60 Hertz (Hz), and a synchronous speed of 1000-2000 rotations per minute (rpm). In some instances, the designs and methods for constructing, installing, and/or refurbishing stators described herein are applicable to generators/motors with different electrical ratings not explicitly described herein.

As will be described in more detail below, failure of one or more of the components included in the original stator may be attributed to deficiencies in the designs, methods, and/or materials used to construct, install, and/or refurbish the original stator. As one example, original stator winding turns and connections result in increased circulating current losses that contribute to an increased winding temperature and reduced insulation life. Additionally, original stators include cooling blocks that block the air path at the core side of winding overhang portions. These cooling blocks also create pinch points that damage insulation due to movement and vibrations of the wind generator.

Table 1 provides a modelled performance of a wind turbine generator implementing an original stator, including eddy and circulating current losses resulting from the specific design parameters of the original stator.

TABLE 1

Modelled Performance of Original Stator Design

| | | Description | Original Design | Unit |
|---|---|---|---|---|
| | | Output Power | 660 | kW |
| Losses | Stator | Conductor $I^2R$ | 5.113 | kW |
| at | | Additional Eddy and | 34.46% | |
| Full | | Circulating Current Losses | 1.762 | kW |
| Load | | Total | 6.875 | kW |

Additionally, Table 2 provides modelled flux densities of a wind turbine generator implementing the original stator.

TABLE 2

Modelled Flux Densities of Original Stator Design

| Description | | Original Design | Unit |
|---|---|---|---|
| Stator | Core | 1.214 | T |
| | | 78342 | lines/in$^2$ |
| | Teeth | 1.327 | T |
| | | 85593 | lines/in$^2$ |
| Rotor | Core | 0.879 | T |
| | | 56722 | lines/in$^2$ |
| | Teeth | 1.028 | T |
| | | 66348 | lines/in$^2$ |

Typically, wind turbine generators of this size can achieve flux densities up to 1.6 T (or 103226 lines/in$^2$). Embodiments described herein replace components of original stators that may have experienced failure with new components or in new configurations that reduce total losses and change flux density.

FIG. 1 illustrates an example stator winding 100 of an original stator. The stator winding 100 is a four-circuit star connection winding with three turns per coil 102 and top-to-top and bottom-to-bottom connections 104. The stator winding 100 has significant stator copper losses as a result of eddy and circulating currents (as calculated in Table 1). As the stator winding 100 has less than five turns per coil, the stator winding 100 has decreased efficiency, increased winding temperature, reduced insulation life, and reduced wind generator power output.

Figure 2:
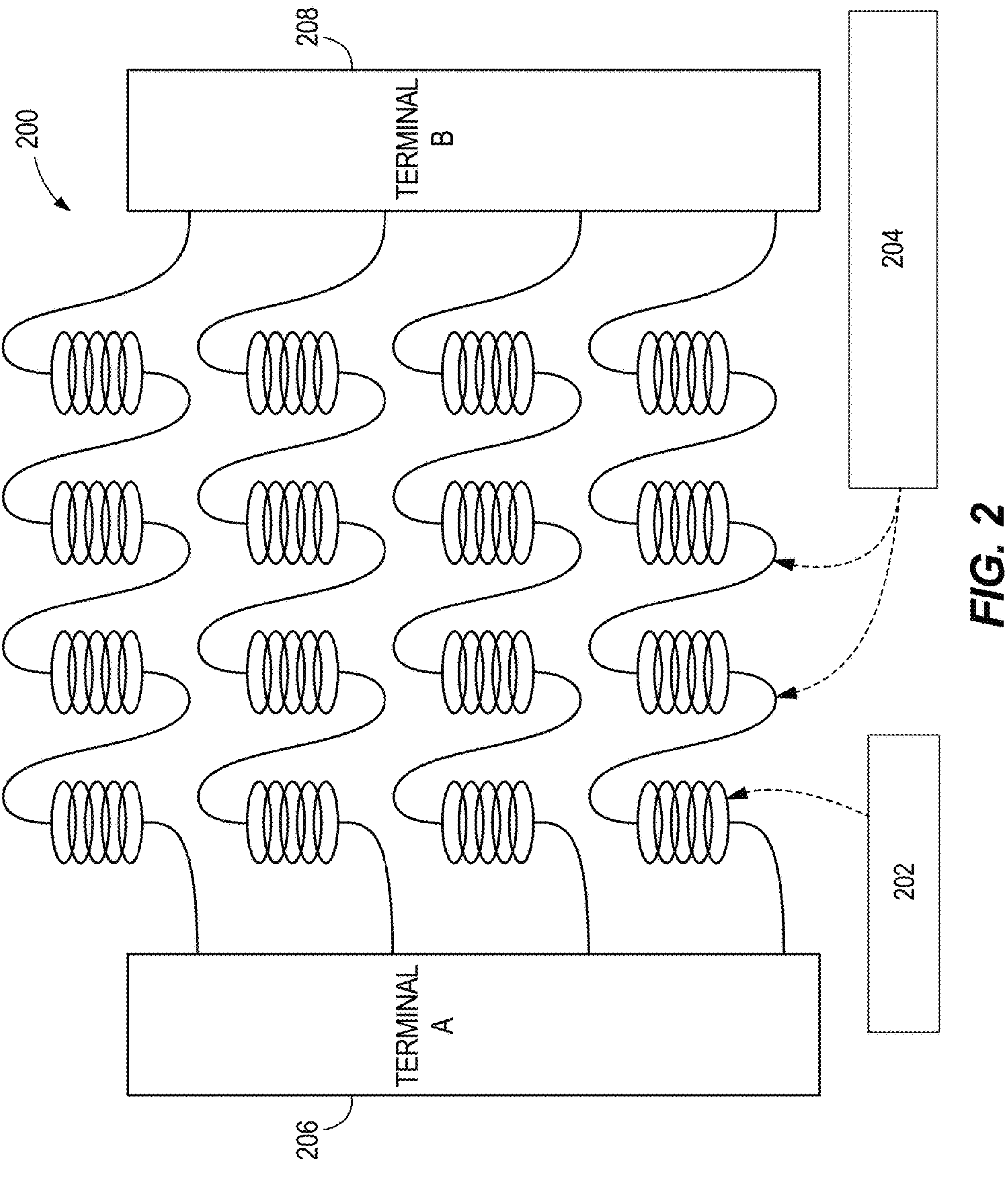
FIG. 2 illustrates a winding configuration for an example replacement.

The stator winding 100 may be replaced with replacement stator winding 200, shown in FIG. 2. FIG. 2 shows only one of the three phases of the winding. The other two phases are identical to the phase shown in FIG. 2. The replacement stator winding 200 is connected in a four-circuit delta connection having five turns per coil 202 and top-to-bottom connections 204. By replacing the stator winding 100 with the replacement stator winding 200, the eddy and circulating current losses are reduced by approximately 90.14%, and total stator conductor losses are decreased from 6.875 kW to 5.011 kW. Additionally, replacing the stator winding 100 with the replacement stator winding 200 reduces overall losses, increases the efficiency of the stator, decreases winding temperature, increases insulation life, and increases wind generator power output.

Additionally, as shown in FIG. 1, the starts of the coils to the line lead and finishes of the coils 102 to the star connections 106 in the stator winding 100 are brazed on the overhang of the winding. These braze joints 108 may crack or break due to vibration of the wind turbine generator, temperature cycling, and/or shock load changes.

Accordingly, in the replacement stator winding 200, all of the starts and finishes of the coils 202 are brought to the terminal box and bolted directly to the terminals (e.g., first terminal 206 and second terminal 208). No brazing is utilized to join the coils with the terminals 206, 208, eliminating the braze joints as a point of failure. Additionally, as the replacement stator winding 200 is connected in a delta connection, there is no star connection.

Figure 3:
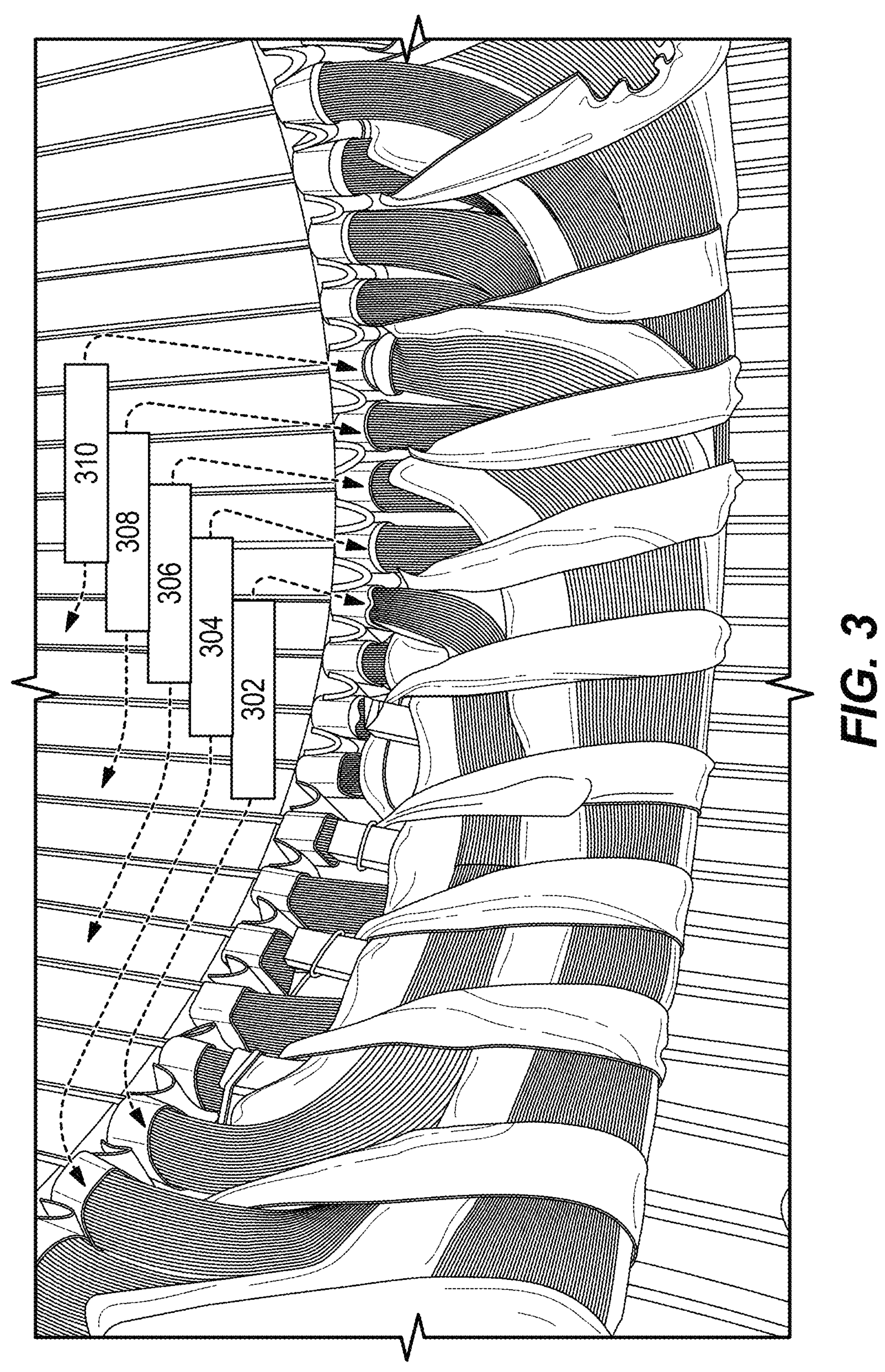
FIG. 3 illustrates an example stator winding distributive winding (also known as "lazy lap") configuration.
Figure 4:
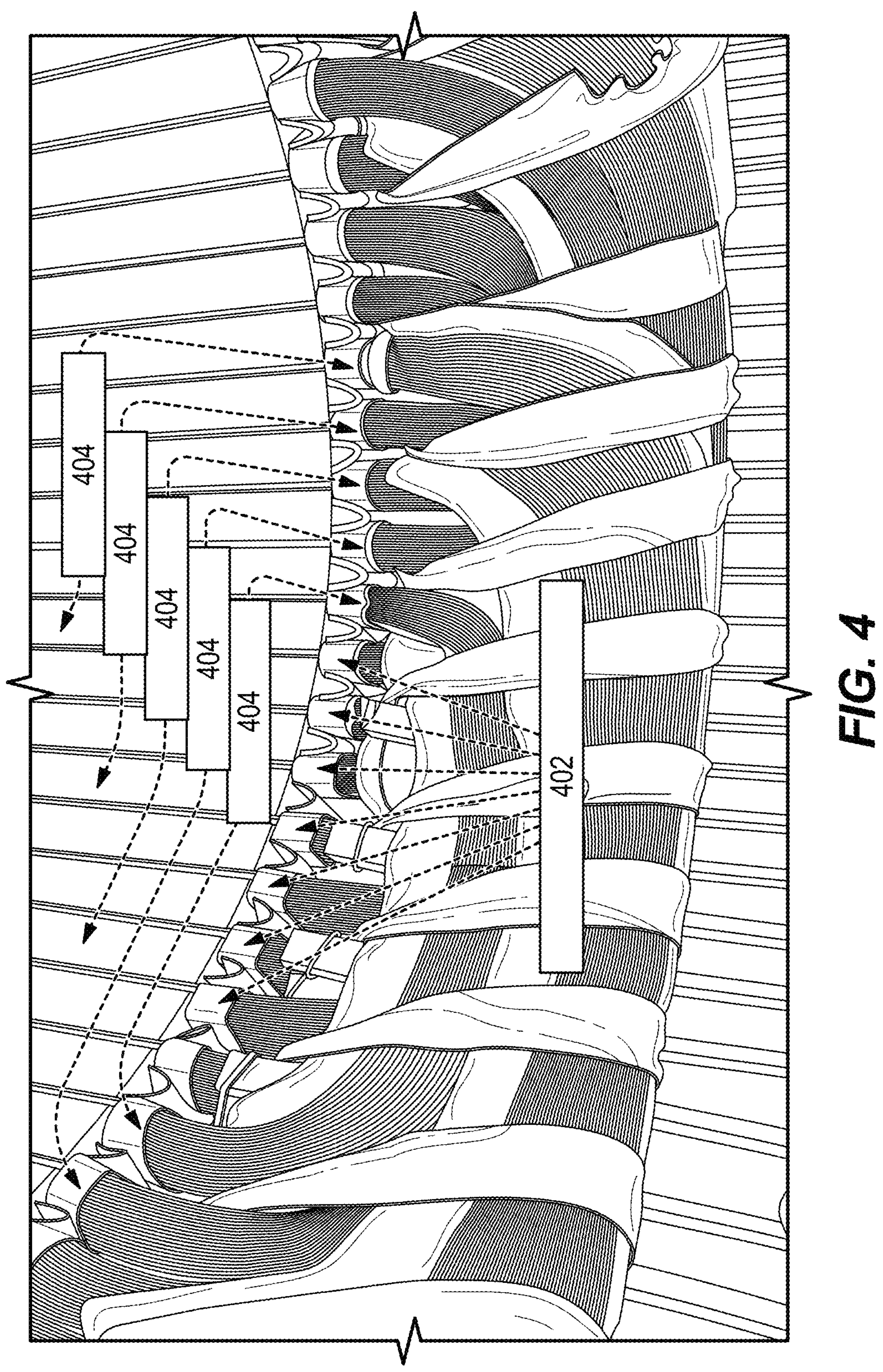
FIG. 4 illustrates an example stator winding distributive winding (also known as "lazy lap") configuration.

Original stators for wind turbine generators have windings in a distributive winding configuration and wound in a method referred to as a "lazy lap" method, shown in FIGS. 3-4. Specifically, the original stator winding span is a set number for each coil, such as 1-to-10 span 302, 1-to-12 span 304, 1-to-14 span 306, 1-to-16 span 308, and 1-to-18 span 310, as shown in FIG. 3. Furthermore, the coils are wound bottom-only first (see 402), and then other coils are wound top-only (see 404), known as the "lazy lap" method, or "top to top and bottom to bottom" configuration, shown in FIG. 4.

The original, distributive winding configuration of FIGS. 3-4 increases the effective inter-group and inter-coil voltage, making coil and phase separation complicated and difficult to achieve uniformly. Additionally, the original winding configuration increases the risk of coil to coil and phase to phase shorts. Circulating currents are also increased due to non-equal mean lengths of turns between top and bottom coils and span coils. This increase in circulating currents increases stator losses and overall losses, decreases efficiency, increases winding temperature, reduces insulation life, and reduces wind generator power output. The distributive winding with the lazy lap configuration also requires copies of multiple different coil shapes (in this specific example, six copies of ten different coil shapes) to be manufactured for each stator rewind, increasing coil manufacturing complexity and times.

Figure 5:
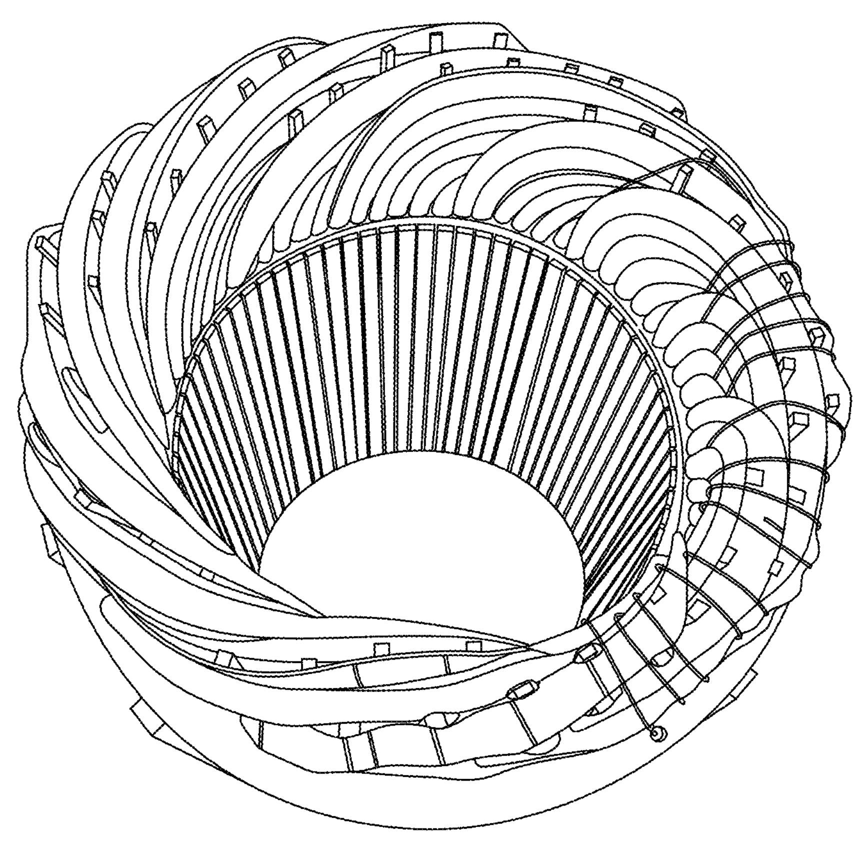
FIGS. 5-6 illustrate an example stator having a lap wound, single span winding configuration.
Figure 6:
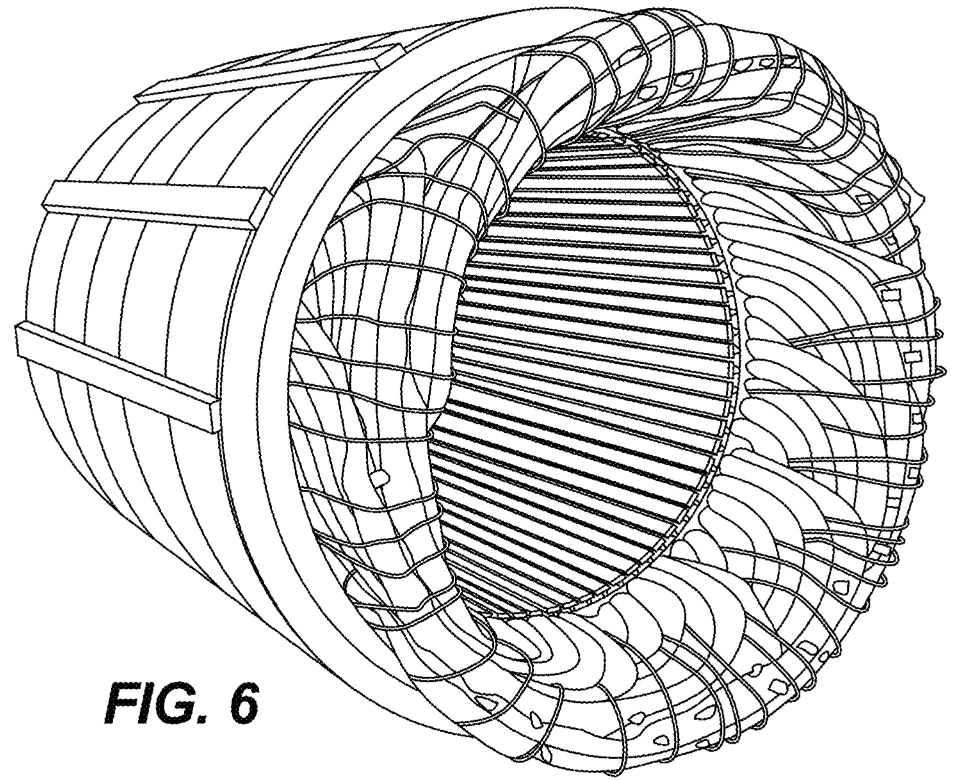

Embodiments described herein replace the original, distributive winding configuration with a lap wound, single span configuration, shown in FIGS. 5-6. The original winding may be a concentric winding. The pitch may be adjusted to maintain the same stator flux density. By changing to a lap wound, single span configuration, coil manufacturing is simplified and manufacturing time is reduced, as sixty coils of a single coil shape are manufactured. Additionally, as the coils are identical, the mean length of a turn is also equal in all coils, reducing the circulating current and associated losses. Additionally, the lap wound, single span configuration results in uniform coil to coil and phase to phase voltages throughout the winding, enabling installation of phase separators, described below in more detail.

Original stators for wind generators are often manufactured in Europe and use metric conductor sizes. This adds additional cost and lead time to repairs if these same metric wire sizes are used in the US. When replacing the original stators, standard US American Wire Gauge (AWG) wire sizes (as specified in the NEMA MW 1000 specification) may instead be used that match the original conductor cross sectional area. For example, four AWG 16 and twenty-four AWG 17 wires may be used.

Additionally, the insulation of conductors found in original stators is insufficient and too low of a rating for the calculated volt per coil. Traditionally, conductor covering is selected based on the volt per turn. The calculated volt per turn for original stators is approximately 25.4 V. However, as the winding is a mush winding (or a random wound), it is not possible to guarantee that each turn is only adjacent to the subsequent turn. Additionally, with three-turns per coil as in the original stator, the volt per coil is 76.2 V.

Embodiments described herein replace the original windings with a high conductivity, fully annealed copper winding with "quad film" insulation, providing protection against the high voltage per coil. As the winding configuration is also altered to be a four-circuit delta connection having five turns per coil, the volt per coil increases to 132.0 V. The quad film insulation is capable of insulating these high voltages, reducing inter-turn failures and increasing reliability and life expectancy.

Voltage stresses on the insulation between the conductors in the slot and the laminated core may increase the risk of a failure in the slot, which could cause significant damage to the core. When replacing the original stator, an aramid paper, polyimide film, aramid paper composite (for example, NKN 3-3-3) slot liner 710 may be added to the stator slots, shown in FIG. 7. The slot liner 710 may be 10 mil thick. The slot liner 710 provides voltage withstand up to 19,000 V and provides mechanical protection from sharp edges and protrusions from the laminated core and slots.

Figure 7:
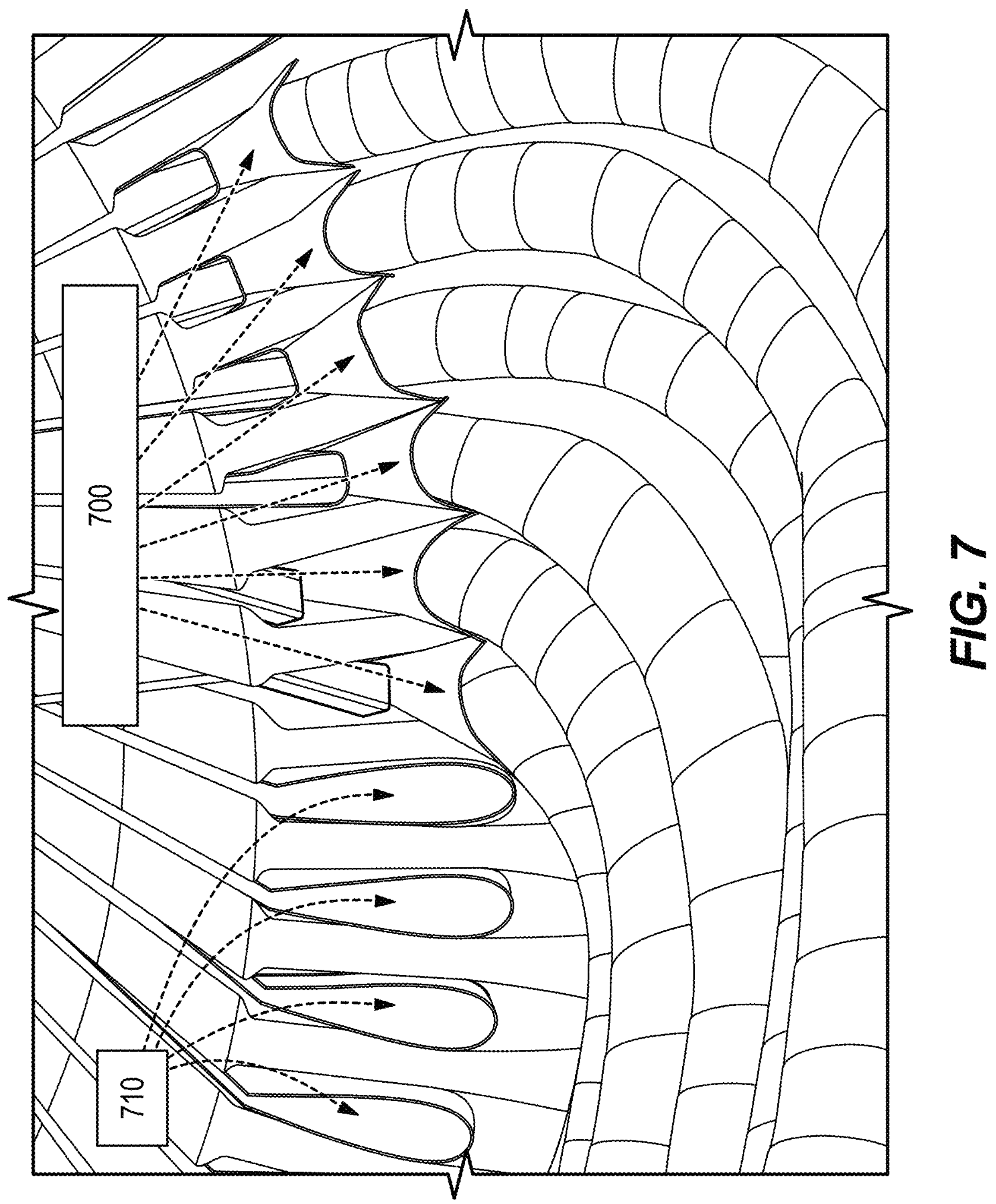
FIG. 7 illustrates an example stator having coil separators.

Additionally, coil insulation between the top and bottom coils may be upgraded to an aramid paper, polyimide film, aramid paper composite (for example, NKN 5-5-5) slot liner 700 (for example, a coil separator), as shown in FIG. 7. The slot liner 700 may be 16 mil thick. The slot liner 700 provides voltage withstand up to 25,000 V.

Figure 8:
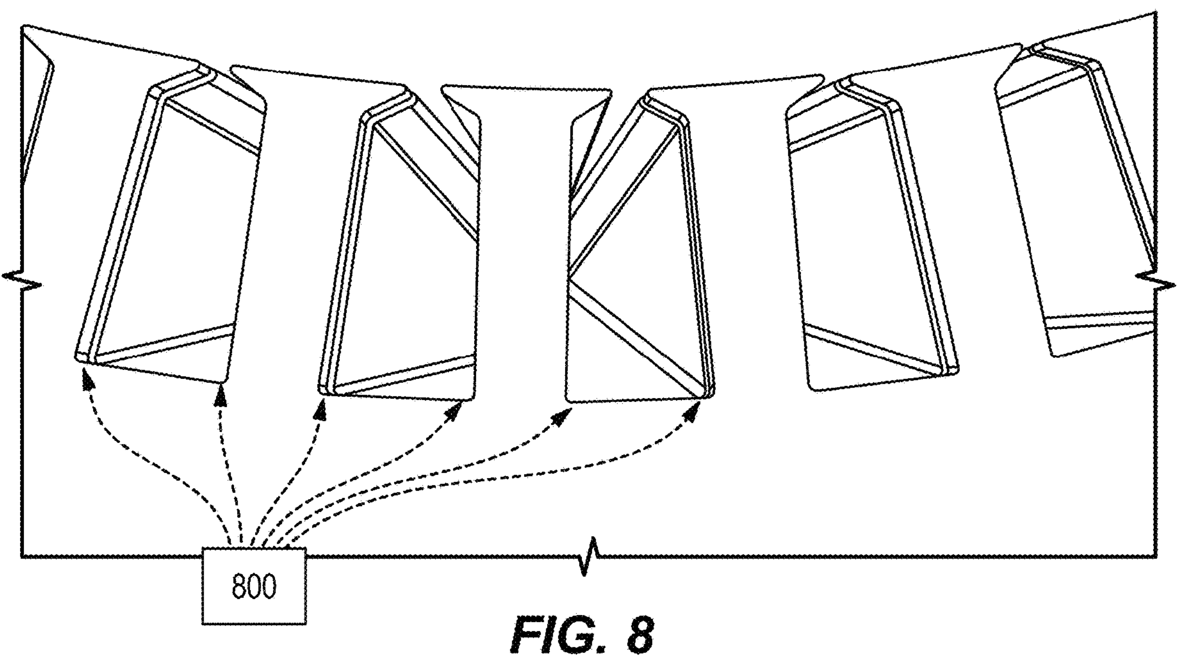
FIG. 8 illustrates example trapezoidal stator slots.
Figure 9:
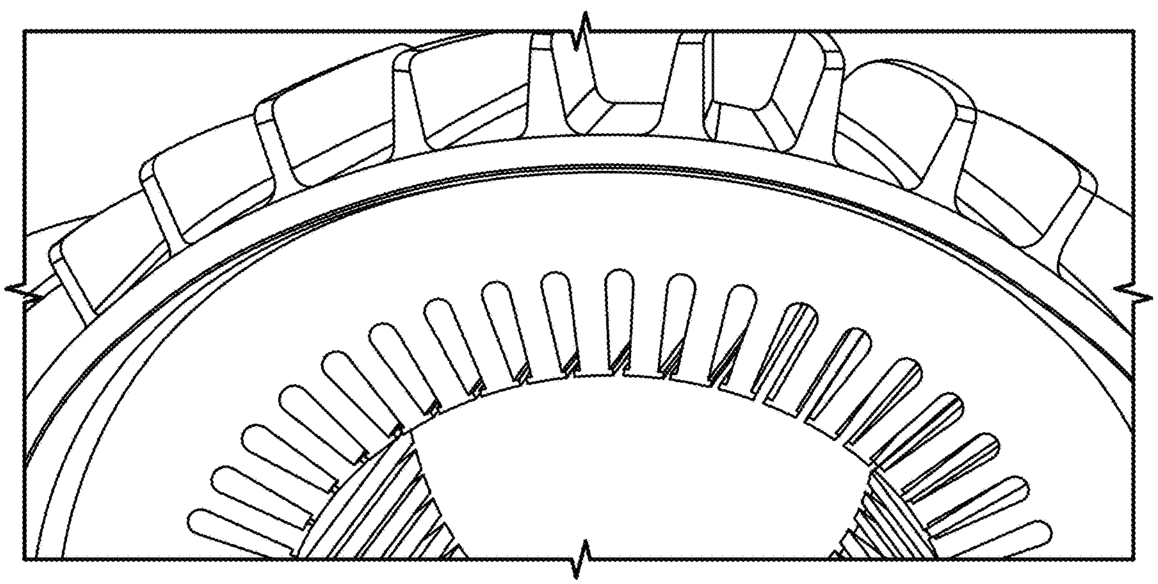
FIG. 9 illustrates example round stator slots.
Figure 10:
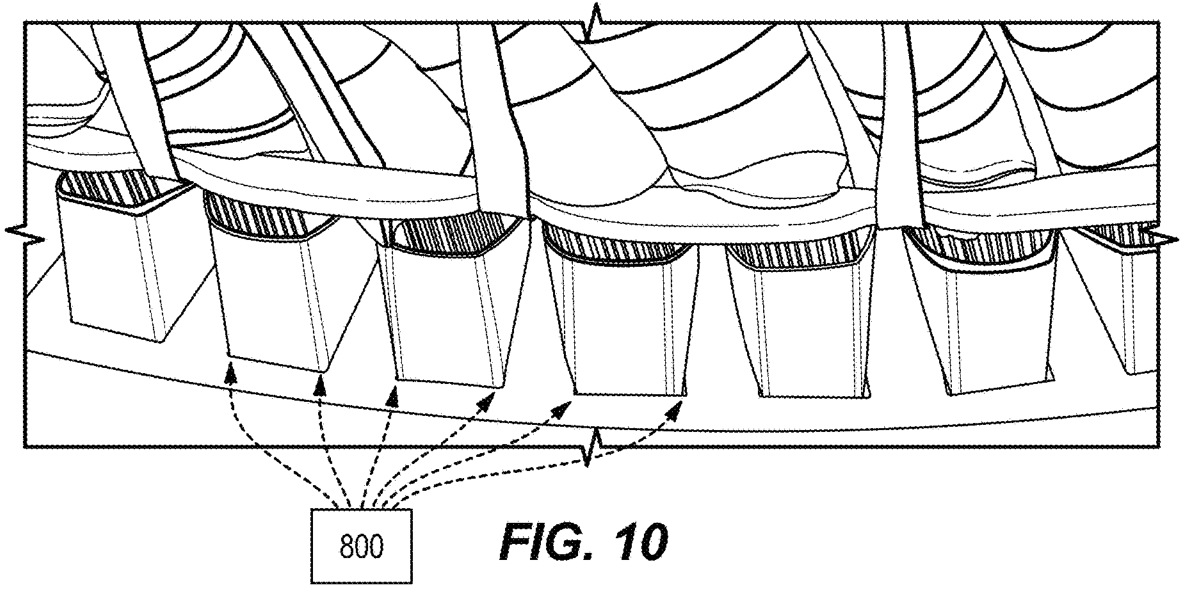
FIG. 10 illustrates example stator slot ends.

The stator slots may have a trapezoidal shape, as shown in FIG. 8. Alternatively, in some instances, round stator slots may be implemented, as shown in FIG. 9. A trapezoidal slot configuration with a standard, non-laminated slot insulation may result in splitting of the slot insulation in the greater than 90° bend 800 at the end of the slot, shown in FIGS. 8 and 10. The addition of aramid paper, polyimide film, aramid paper composite slot liner helps alleviate this issue. Alternatively, the stator core may be replaced. The stator may be manufactured with any of 36, 48, 60, 72, 84, or 96 slots during the core replacement. In some instances, the number of stator slots are determined according to Equation 1:

$$\text{Number of stator slots} = 4 \times 3 \times n \qquad \text{[Equation 1]}$$

Where n=a whole number from and including 3 to and including 8. In some instances, the number of stator slots is a multiple of 12.

Figure 11:
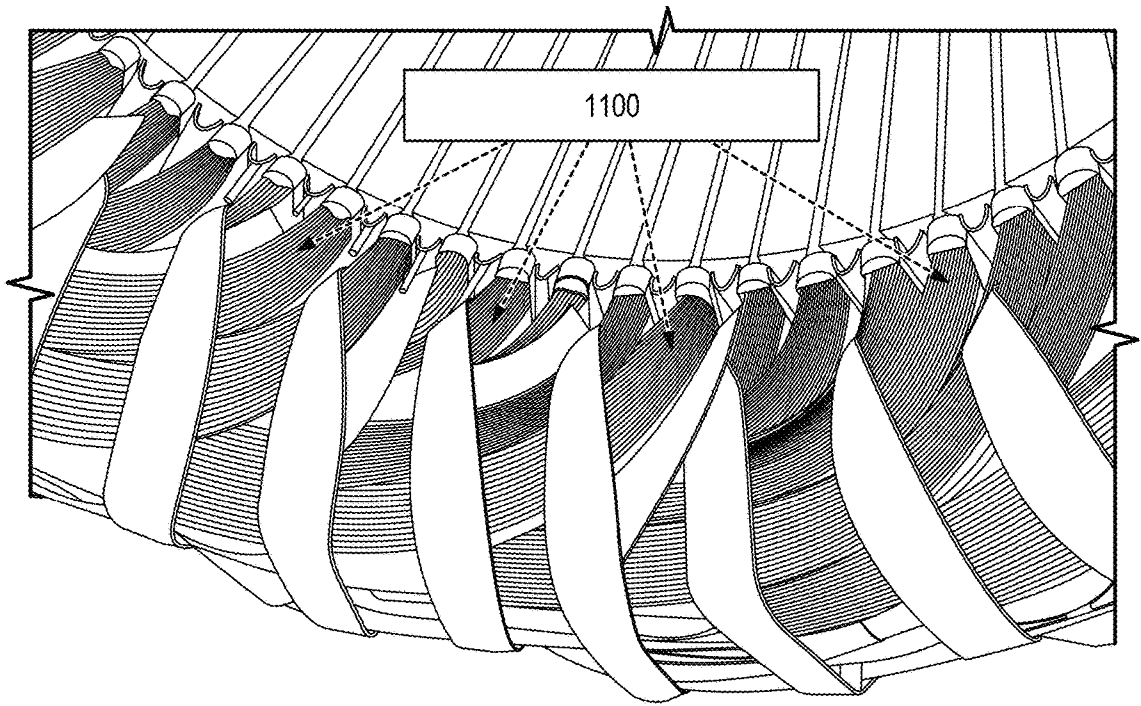
FIG. 11 illustrates an example stator without coil-to-coil insulation.
Figure 12:
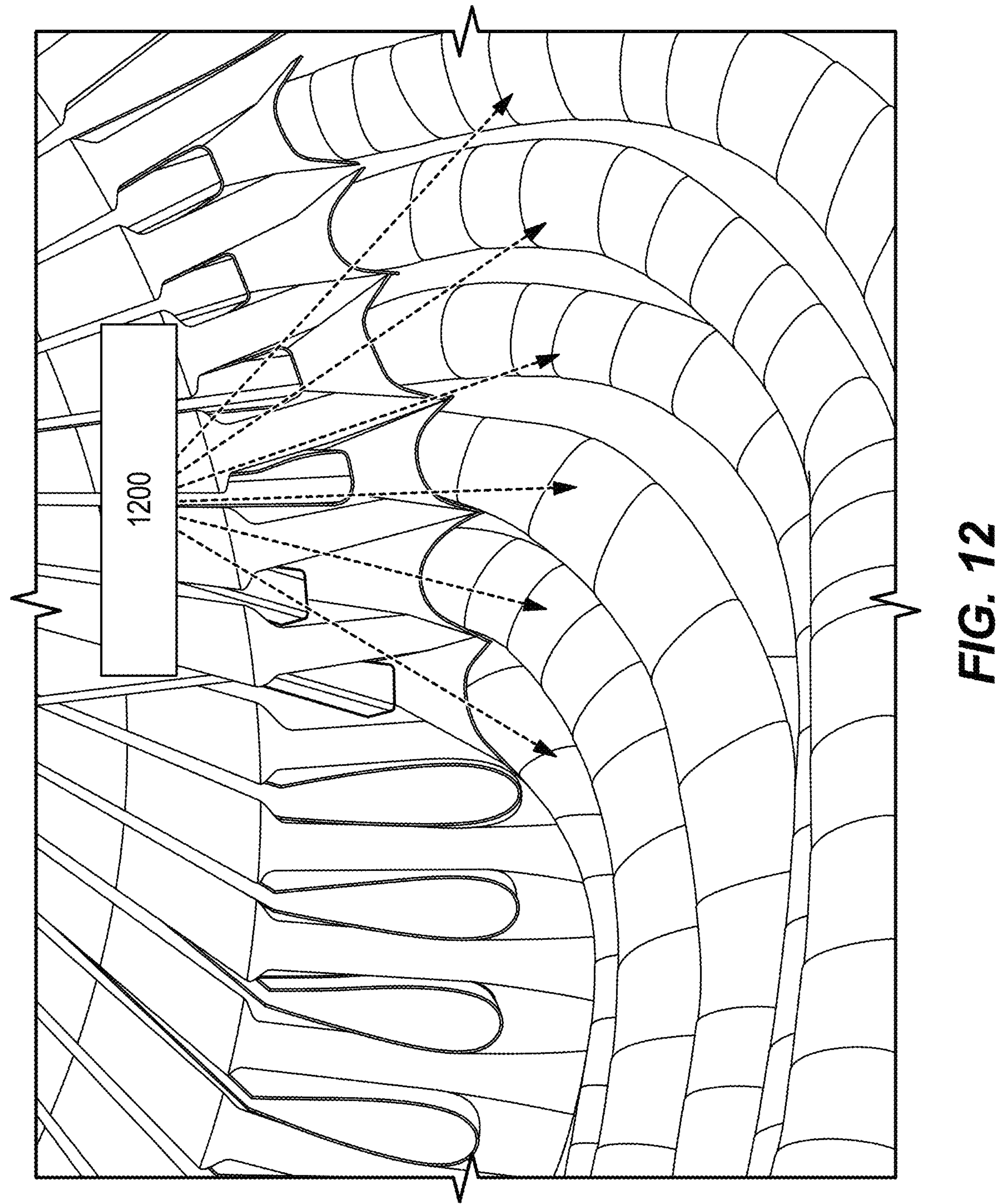
FIGS. 12-13 illustrate example stators having taped overhang portions.
Figure 13:
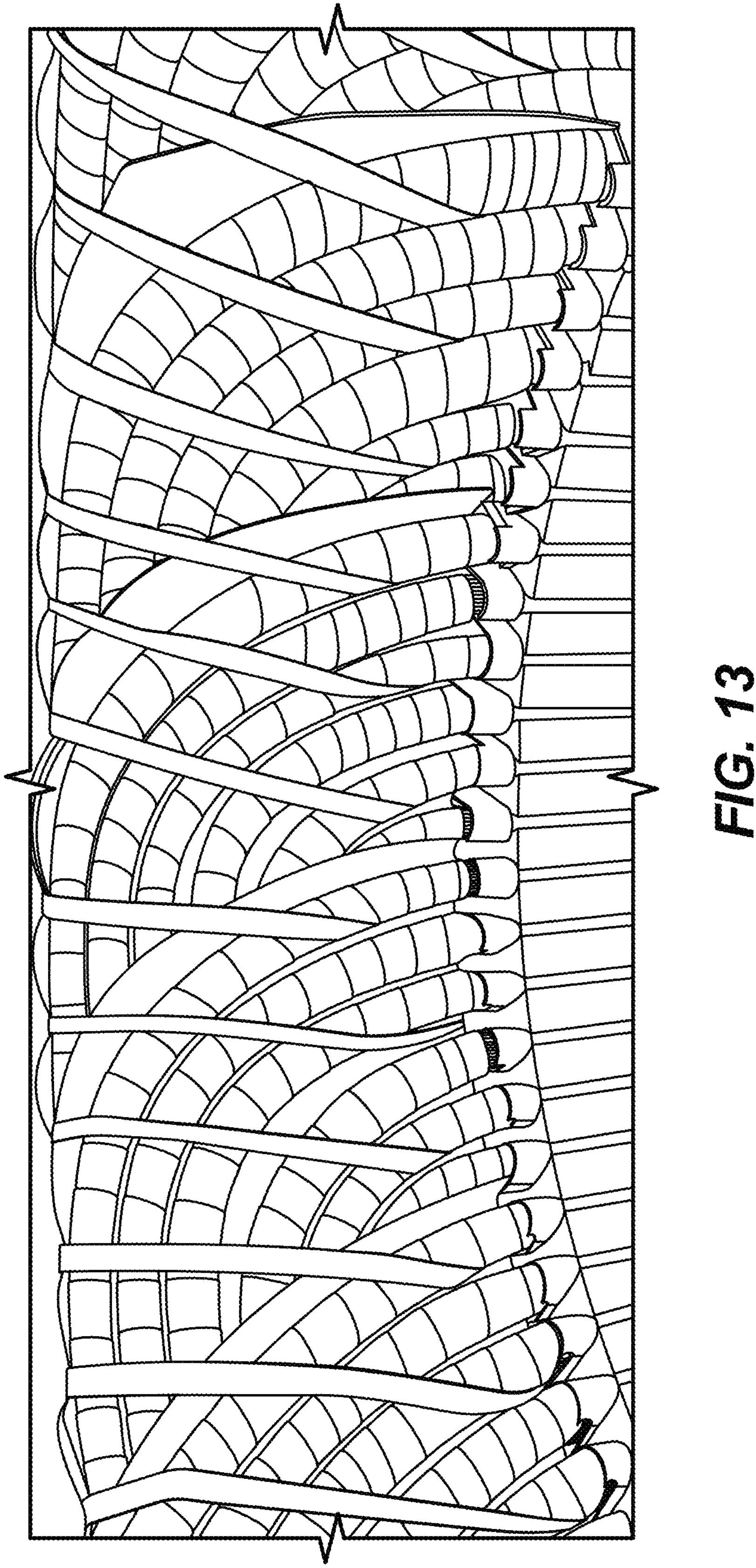

The stator coil to coil insulation in original stators, shown in FIG. 11, is non-existent (see 1100 showing no coil insulation). As the original winding design has a coil-to-coil voltage of approximately 152.2V, the lack of coil-to-coil insulation creates a risk of inter-coil failure on the overhang portion. To provide electrical insulation, each coil end 1200 on the overhang portion is taped with porous glass cloth or tape during repair and/or replacement of the stator, shown in FIGS. 12-13. Since the glass cloth or tape is porous, it soaks in and retains the insulating resin (being epoxy, polyester or silicon based resin), as impregnated during a Vacuum Pressure Impregnation (VPI) process, provides electrical insulation, and provides a mechanical bond and overhang strength for the overhang portions.

Figure 14:
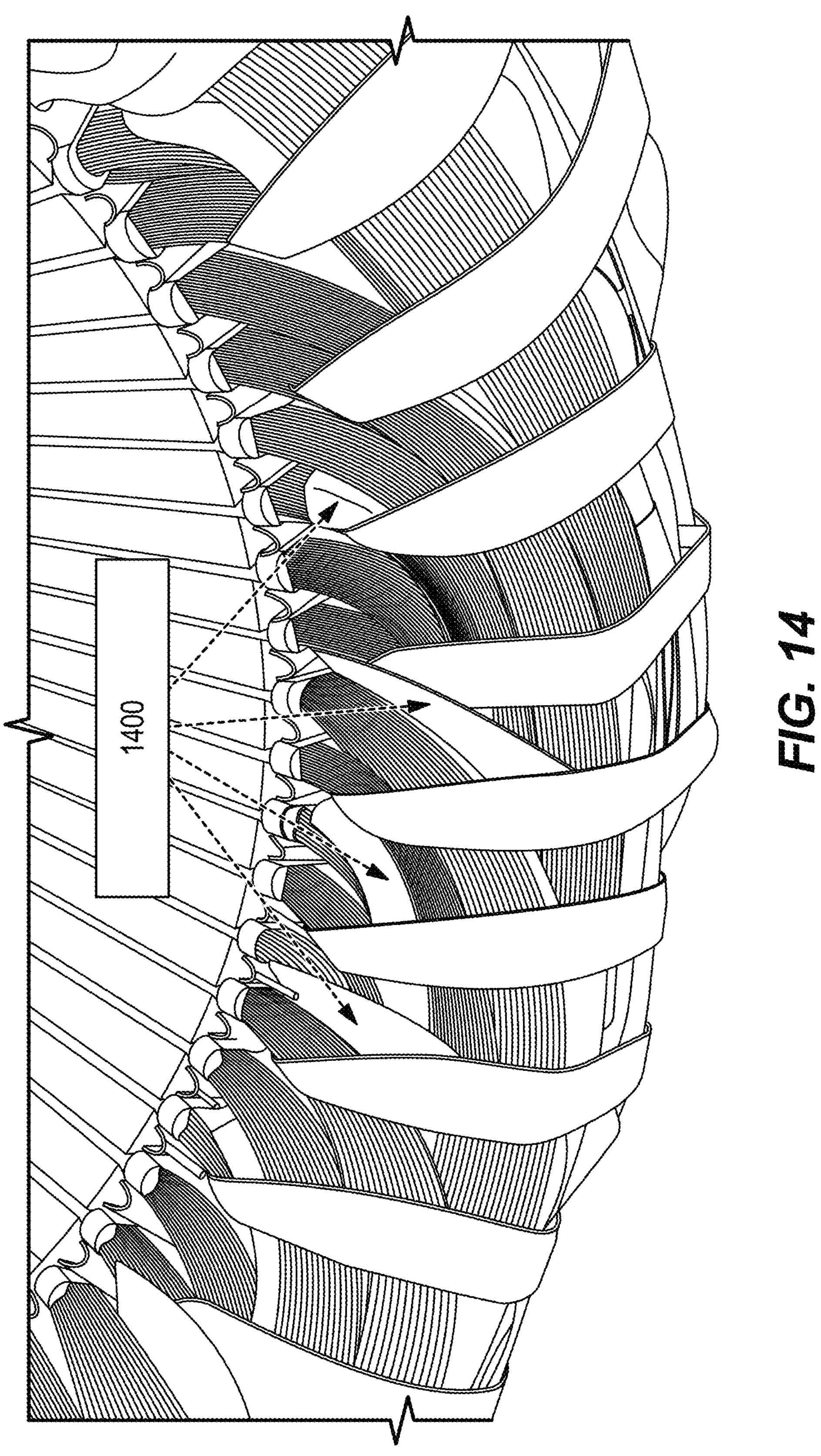
FIG. 14 illustrates an example prior stator having phase separation prone to failure.

The distributive winding configuration implemented by original stators, as previously described, increases the effective inter-group and inter-coil voltage. Additionally, the distributive winding configuration makes coil and phase separation complicated and difficult to achieve uniformly, as shown by phase separation attempts 1400 in FIG. 14.

Figure 15:
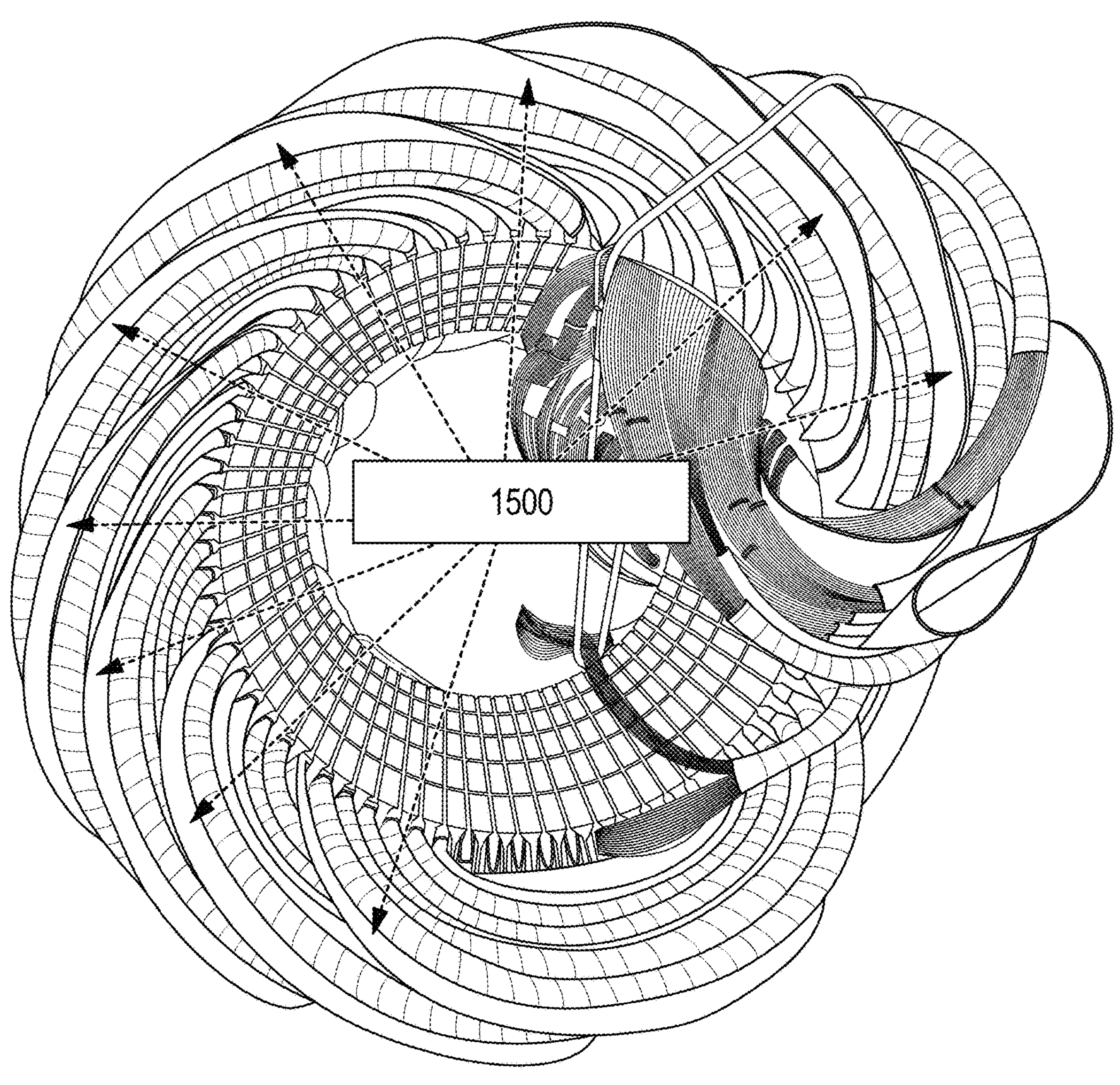
FIG. 15 illustrates an example stator having phase separators between the phases.

When the stator is replaced with a lap wound, single span winding configuration, as previously described, the coil to coil and phase to phase voltages are uniform throughout the winding. This uniformity allows for the installation of phase separators 1500, shown in FIG. 15.

Figure 16:
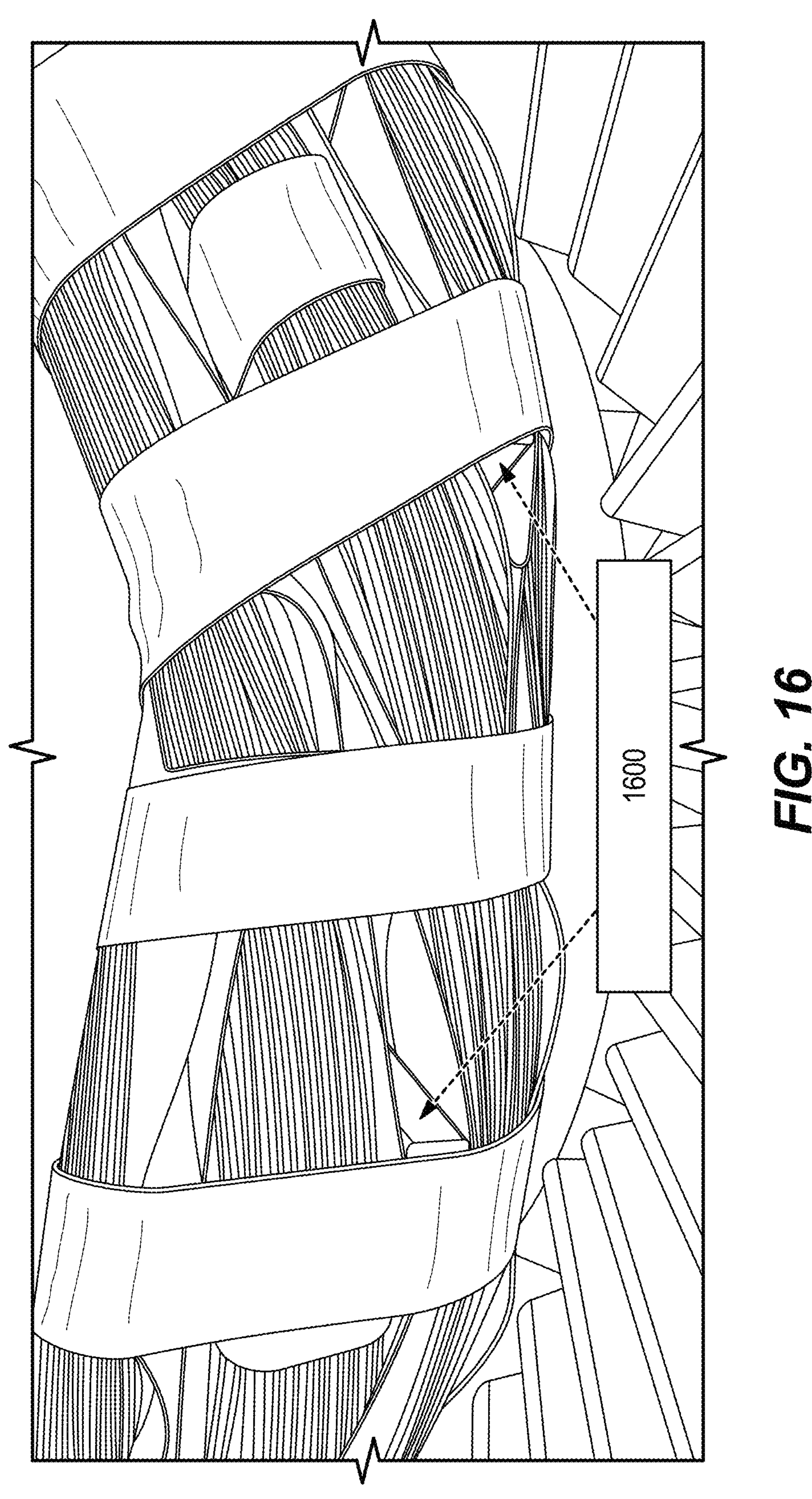
FIG. 16 illustrates an example stator including cooling blocks in a winding overhang portion.
Figure 17:
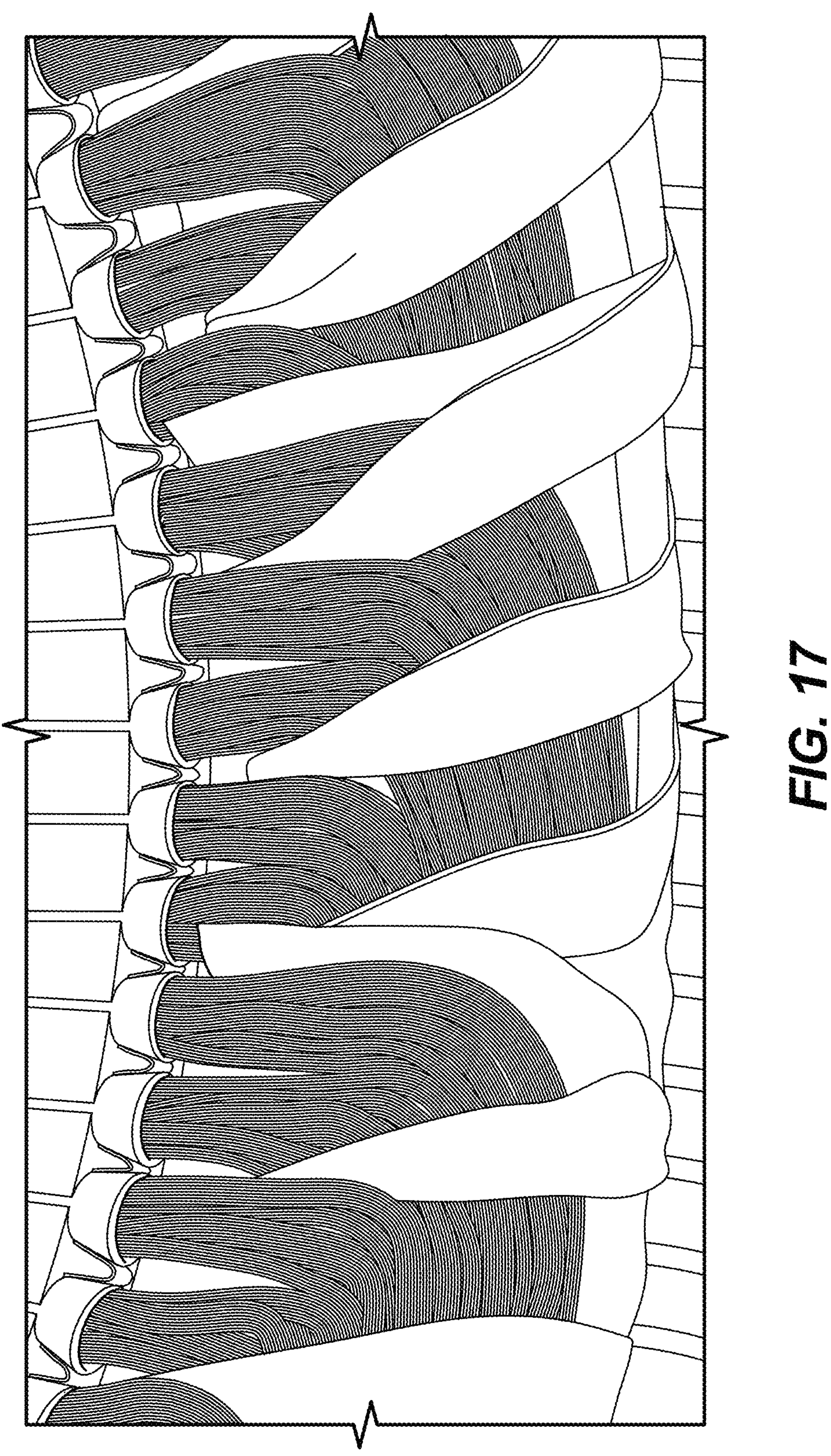
FIG. 17 illustrates an example stator having a cooling path blocked at a core side of the overhang portion.
Figure 18:
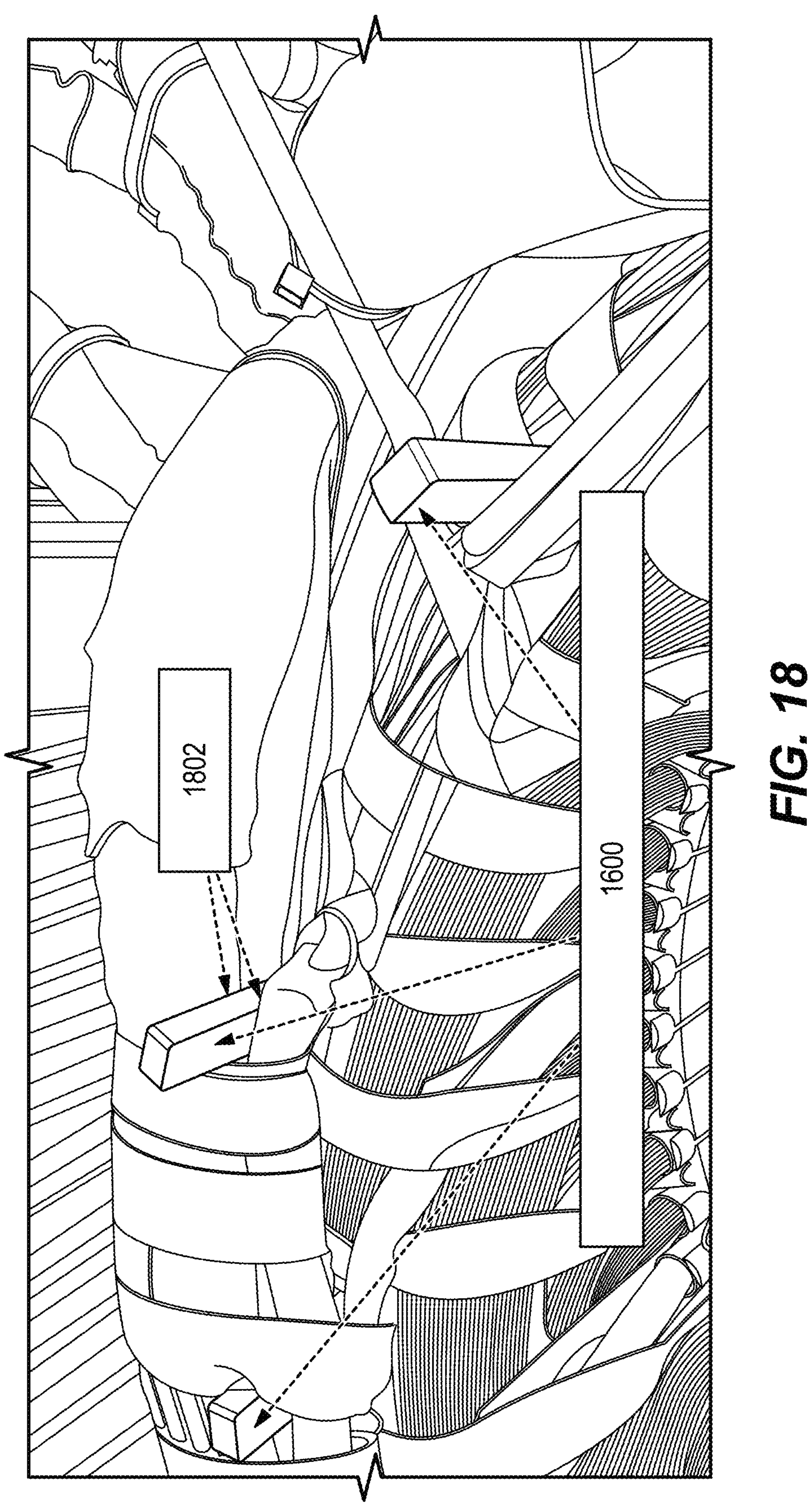
FIG. 18 illustrates an example stator including cooling blocks supporting an overhang connection.

Additionally, solid, non-porous, cooling blocks 1600 are typically implemented in the winding overhang in original stators, as shown in FIG. 16. The cooling blocks 1600 are installed to create an air-path and increase overhang cooling. However, the air path is blocked at the core end, shown in FIG. 17, and thus the air path is effectively closed off. The blockage becomes a "dead air" thermal barrier that reduces the cooling on the winding overhang. On the connection end, as shown in FIG. 18, these cooling blocks 1600 are also used to support the connections from the overhang. Since the cooling blocks are rigid, they do not conform to the shape of the connection, but instead create pinch points 1802 that may damage the insulation due to movement and vibrations of the wind generator. And, since the cooling blocks are solid, non-porous, they cannot be impregnated by the VPI resin and thus the mechanical strength of the overhang is reduced.

Accordingly, during repair and/or replacement of the stator, the cooling blocks may be removed altogether. Removal of the cooling blocks results in a solid, uniform, rigid overhang (that can be impregnated with the VPI resin) that allows for cooling at the overhang without the thermal barrier inside the overhang. Additionally, the connections are lashed directly to the overhang using porous glass tape or yarn, creating a solid, uniform, rigid overhang with increased mechanical strength.

Embodiments of repairing and/or replacing a stator for a wind generator described herein provide particular improvements on the reliability and lifespan of the stator while also achieving improvements in performance. Table 3 provides a performance comparison between the original stator and the replacement stator.

TABLE 3

Comparison between Original Stator Design and Replacement Stator Design

| | | Description | Original Design | Improved Design | Unit | % Change |
|---|---|---|---|---|---|---|
| | | Output Power | 660 | 660 | kW | |
| Losses | Stator | Conductor $I^2R$ | 5.113 | 4.837 | kW | −5.40% |
| at Full | | Additional Eddy and | 34.46% | 3.59% | | |
| Load | | Circulating Current Losses | 1.762 | 0.174 | kW | −90.14% |
| | | Total | 6.875 | 5.011 | kW | −27.12% |

The designs and methods for constructing, installing, and/or refurbishing stators according to the present disclosure are particularly suitable for use in wind turbine generator applications.

Various features and advantages of the aspects described herein are set forth in the following claims.

What is claimed is:

1. A method for refurbishing a stator for use in an electric machine, the method comprising:

at least partially disassembling the stator to provide access to a plurality of stator windings connected in a four-circuit star connection having three turns per coil, wherein the plurality of stator windings are supported by a plurality of slots, adding a three-layer composite slot liner to the plurality of slots, wherein the three-layer composite slot liner is an aramid paper, polyimide film, and aramid paper composite insulation, reconfiguring the stator such that the plurality of stator windings are connected in a four-circuit delta connection having five turns per coil, and insulating the reconfigured plurality of stator windings with quad film insulation.

2. The method of claim 1, wherein the plurality of stator windings has a concentric wound configuration, and wherein the method further comprises:

replacing the plurality of stator windings with a second plurality of stator windings having a lap wound, single span configuration.

3. The method of claim 1, wherein the plurality of stator windings are fully annealed copper windings.

4. The method of claim 1, wherein the stator includes one selected from the group consisting of 36 slots, 48 slots, 60 slots, 72 slots, 84 slots, and 96 slots.

5. The method of claim 1, further comprising:
removing cooling blocks located at an overhang portion of the plurality of stator windings.

* * * * *